Oct. 22, 1929.  J. LAPENSÉE  1,732,848
COLOR IDENTIFYING DEVICE
Filed Feb. 27, 1928
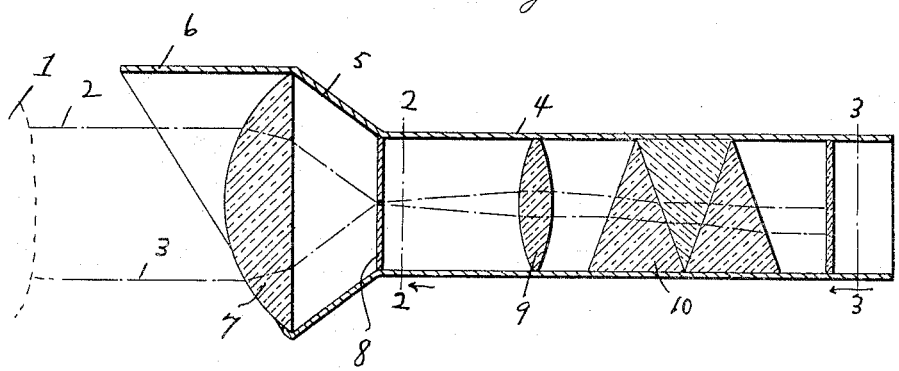
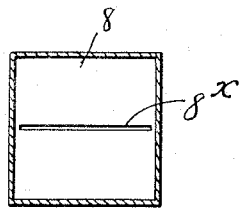 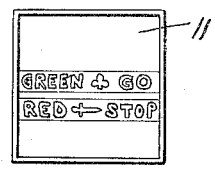
Inventor
Joseph Lapensée
By Clarence A. O'Brien
Attorney Patented Oct. 22, 1929

1,732,848

UNITED STATES PATENT OFFICE

JOSEPH LAPENSÉE, OF PLANTAGENET, ONTARIO, CANADA

COLOR-IDENTIFYING DEVICE

Application filed February 27, 1928. Serial No. 257,350.

The object of my said invention is the provision of a device calculated to enable red and green color blind people to identify a displayed red or green traffic signal color and to distinguish between the same and to ascertain notwithstanding the color blindness, the color of the particular signal displayed.

To the attainment of the foregoing, the invention consists of the improvement as hereinafter described and definitely claimed.

In the accompanying drawings, forming a part of this specification:

Figure 1 is a view showing the preferred embodiment of my invention in longitudinal vertical section.

Figure 2 is a partial cross section taken in the plane indicated by the line 2—2 of Figure 1, looking toward the left.

Figure 3 is a partial cross section taken in the plane indicated by the line 3—3 of Figure 1, also looking toward the left.

Similar numerals of references designate corresponding parts in all of the views of the drawings.

I show diagrammatically in Figure 1, a source of light 1, designed for instance, to display a red light and a green light alternately. I would also have it understood that in Figure 1, 2 designates a green ray of light and 3 designates a red ray of light, each of the said rays emanating from the said source of light 1.

My novel device is preferably, although not necessarily, made in general simulation of a conventional flash light, and it is designed to be mounted on a movable support, not shown, near the windshield of an automobile, and pointed at a signal light from a great distance, when necessary.

Manifestly, the device may be used to advantage on locomotives, street cars, and ships, where it is necessary to identify green and red signals and a green and red color blind operator is in charge.

Among other elements, the device illustrated comprises a casing 4, the major portion of which is cylindrical. At its forward end the major portion of the casing 4 is provided with a flared portion 5 and on the said portion 5 is a projecting canopy 6, which is black on its inner side and is designed to shade a lens 7 held in the flared portion 5, the said lens 7 being convex at its forward side and flat at its rear side.

In the forward end of the cylindrical portion of the casing 4 is a diaphragm 8 of imperforate character save that it is provided with a slit $8^x$, Figures 1 and 2.

In the cylindrical portion of the casing 4 and spaced in rear of the diaphragm 8 is a double convex lens 9, and preferably of short focal length with a view to rendering it feasible to make the device short. The said lens 9 is preferably placed about one and one-half times its focal length in rear of the slit $8^x$. It will be understood that green and red rays of light emanating from the double lens 9 run parallel from the lens 9. Arranged in the cylindrical portion of the casing 4 and spaced in rear of the double lens 9 is a set of prisms 10, the intermediate prism being reversely arranged to the other two. Said prisms are placed horizontally near the double convex lens 9, in order that the green and red rays may take their relative positions with respect to a diaphragm 11, spaced in rear of the prisms 10 and also carried by the cylindrical portion of the casing 4. Three triangular prisms 10 may be employed and are preferably employed but the number of prisms may be increased if a wider dispersion of the colors is needed, provided that the source of light 1 is sufficiently intense or the lens 7 is of a large size.

It will be understood from the foregoing that the diaphragm 8 is opaque and consequently all light passing said diaphragm 8 must pass through the slit $8^x$. The rear end of the cylindrcial portion of the casing 4 is entirely open, so that the diaphragm 11 is in full view of a person in rear of the device. The diaphragm 11 is in the nature of a screen, in order to enable a person in the rear of the device to see distinctly and freely the green and red colors cast on said diaphragm, and by comparison of Figures 1 and 3, it will be understood that the diaphragm 11 has a green space and a red space, the green space bearing the word "Green" and the representation of a shamrock and the word "Go" and the red space carrying the word "Red", a dagger sign indicative of danger and the word "Stop".

In the practical use of my novel device, when the source of light or signal 1 is green, the green rays of light emanating therefrom pass through the several described elements of the device and illuminate the word "Green", the shamrock representation, and the word "Go", whereas, when the signal or source of light is "Red", the red rays emanating from the signal or source of light 1 will, after passing through the several described elements of the instrument illuminate the red space on the diaphragm 11, and of course the word "Red" the representation of a dagger and the representation of the word "Stop" will also be illuminated.

Manifestly, an educated though color blind person noting the word "Green" and the word "Go" are illuminated will be apprised of the fact that the green signal is displayed, and when the device is used by an illiterate person, the illumination of the shamrock representation will convey the idea to such person that the green signal is displayed. Likewise when the words "Red" and "Stop" are illuminated, an educated person will know that the signal displayed is red and when the device is used by an illiterate person, the illumination of the dagger representation indicative of the "danger" will apprise such illiterate person that the displayed signal is red.

When deemed expedient, the diaphragm 11 may be in the form of a piece of plane translucent glass. When the diaphragm 11 is in the latter form, the bright color on the glass would mean, to the average color blind person that the green signal was displayed and that it was proper to proceed, without danger, whereas when a danger color is imposed on the glass, the average color blind person would understand that the red or danger signal was displayed.

The diaphragm 11 may conveniently be in the form of a piece of plane translucent ground glass but it may also be in the form of any other suitable translucent material.

I would also have it understood that to any average color-blind person a bright color cast on the green space of said diaphragm will mean that the signal displayed is green, and that a faint color cast on the red space of said diaphragm 11 will mean that a red or danger signal is displayed.

What is claimed is:

1. A device for enabling red and green color blind people to identify a displayed signal color comprising a casing, spaced lenses therein, an opaque slitted diaphragm disposed in the casing and between and spaced from said lenses, reversely arranged prisms located in the casing and spaced in rear of the rear lens, a screen in the casing and at the rear of the prisms, and means carried by said screen for enabling a color blind person to determine when the screen is illuminated by green rays and also when it is illuminated by red rays.

2. A device for enabling red and green color blind people to identify a displayed signal color comprising a casing, spaced lenses therein, an opaque slitted diaphragm disposed in the casing and between and spaced from said lenses, reversely arranged prisms located in the casing and spaced in rear of the rear lens, a screen in the casing and at the rear of the prisms, and means carried by said screen for enabling a color blind person to determine when the screen is illuminated by green rays and also when it is illuminated by red rays, the casing being provided with a forward flared portion on which is a projecting canopy, and the forward lens being convexed at its forward side and plane at its rear side, and the rear lens being convexed at both sides.

In testimony whereof I affix my signature.

JOSEPH LAPENSÉE.